Patented Apr. 4, 1939

2,152,785

UNITED STATES PATENT OFFICE 2,152,785

AUTOMATIC WELDING CONTROL

John H. Blankenbuehler, Edgewood, Pa., assignor to Westinghouse Electric & Manufacturing Company, East Pittsburgh, Pa., a corporation of Pennsylvania Application June 9, 1937, Serial No. 147,247

20 Claims. (Cl. 219—8)

My invention refers generally to control systems and has reference in particular to a system of crater elimination control for use with automatic arc welding machines or systems.

In electric arc welding systems where automatic welding heads are used to feed the electrode and maintain a welding arc, it may well be desirable to terminate a weld seam in such a manner that the usual weld crater at the finishing point is not so apparent or is eliminated. Particularly may this be advantageous in cases of circumferential welding wherein a continuous seam is produced which terminates at its point of origin. Likewise, in other forms of welded construction where a finished surface is desired and a smooth weld is necessary, means for automatically eliminating the usual arc crater at the termination of a weld may prove an important feature of the welding control.

It is, therefore, an object of my invention to provide means in an automatic arc welding system for limiting the flow of welding current and reducing the penetration of the arc adjacent to the termination of a weld seam.

Another object of my invention is to provide in an automatic arc welding system for reducing the flow of welding current prior to the termination of the relative motion of the work and a welding electrode to reduce penetration, lengthening the arc to further reduce penetration thereof, and upon the completion of predetermined conditions terminating relative motion of the work and electrode and opening the welding circuit.

Still another object of my invention is to provide in an automatic arc welding system for circumferential welding for reducing the penetration of the arc after relative rotation of the work and welding head through 360° and opening the welding circuit after a predetermined amount of overtravel with such reduced arc penetration.

Yet another object of my invention is to provide a control system for an automatic arc welding circuit whereby automatic limitation of weld penetration may be secured prior to cessation of relative travel of the work and the welding electrode regardless of whether such cessation of relative motion is initiated manually or automatically.

A further object of my invention is to provide in an automatic arc welding system for reducing the flow of welding current and controlling the feed motor to increase the length of the arc, substantially prior to deenergization of the welding circuit and stopping of relative travel of the work and electrode.

A still further object of my invention is to provide in an automatic arc welding system for controlling the characteristics of a welding circuit and an electrode feed motor control circuit to limit the flow of welding current and increase the length of the arc substantially prior to the termination of a welding operation.

My invention, accordingly, is disclosed in the embodiments hereof shown in the accompanying drawings, and comprises the features of construction, combination of elements, and arrangement of parts, which will be exemplified in the construction hereinafter set forth, and the scope of the application of which will be indicated in the appended claims.

In a general embodiment of my invention, relay means may be provided in connection with an automatic arc welding circuit for controlling the welding circuit and feed motor control circuit to reduce the flow of welding current and control the feed of the electrode to increase the length of the arc sustained by the electrode feed means, substantially prior to the termination of a welding operation. Penetration of the weld arc may thus be reduced adjacent to the termination of a welding operation so as to produce a weld without the usual objectionable weld crater at its finish.

From a reference to the following description, taken in connection with the accompanying drawings, it may be seen that the feature of reducing the arc penetration in an automatic welding system prior to cessation of the welding operation may be attained in a number of ways, and in connection with a varied assortment of welding systems and control circuits. In the description hereinafter set forth, my invention is shown in connection with an arc welding system employing generally a welding generator of the cross-field type as a source, and having a Wheatstone bridge form of electrode feed control, as set forth and described in detail in United States Letters Patent No. 2,057,521, issued to William R. Harding on October 13, 1936, and assigned to the assignee of this application. It may be seen, however, to be obvious and well within the scope and spirit of my invention to apply it to other systems of arc welding having different methods of electrode feed control and other sources of welding current.

For a more complete understanding of the nature and scope of my invention, reference may be had to the following description taken in connection with the accompanying drawings, in which like reference characters designate like parts and in which.

Figure 1:
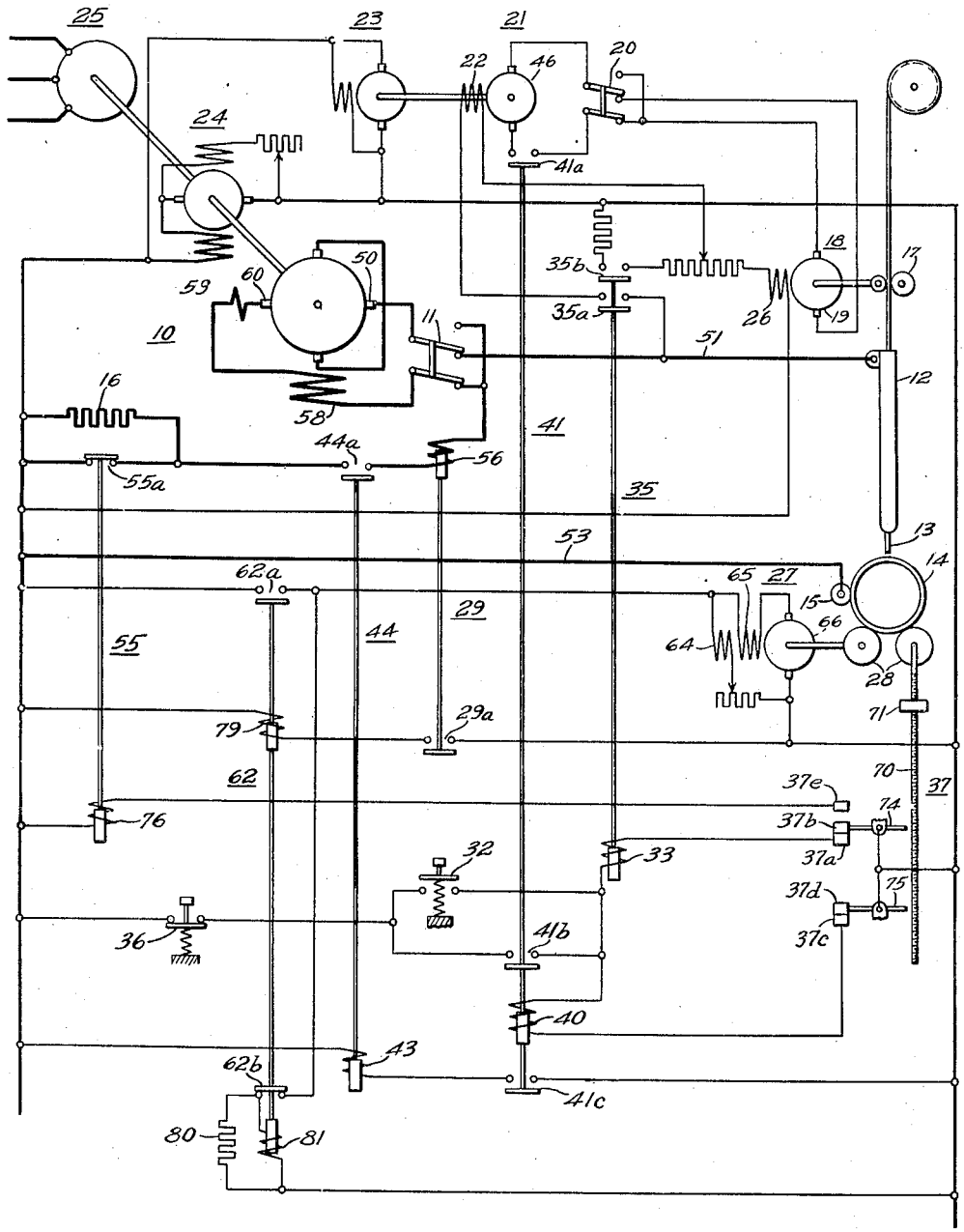
Figure 1 illustrates diagrammatically an embodiment of my invention as applied to an automatic arc welding system.

Referring more particularly to Fig. 1, the reference numeral 10 denotes generally a source of welding current, comprising a cross-field generator, connected by means of a polarity reversing switch 11 to a welding circuit including an electrode guide nozzle 12, a welding electrode 13, work 14 upon which a welding operation is to be performed, a return current connection such as contact roller 15, which is disposed to complete the welding circuit from the work back to the source, and a current limiting resistance 16 which may be used to limit the flow of welding current when desired.

To provide for feeding the electrode 13, feed rolls 17 may be disposed in engagement therewith and driven by a reversible feed motor 18. The armature 19 of the feed motor may be connected through a reversing switch 20 with a control generator 21, the shunt field winding 22 of which may be disposed in the balancing circuit of a Wheatstone bridge control circuit so that performance of the feed motor 18 is made responsive to the welding arc conditions, as set forth in detail in aforementioned Patent 2,057,521.

A control motor 23, which is connected to drive the control generator 21, may be energized from any suitable constant potential source of excitation, such as the constant potential generator 24, the voltage characteristics of a constant current type of welding generator not being suitable to permit its use as a source of control excitation. This generator 24 may be driven in connection with the generator 10 by means of the motor 25, and may provide a source of excitation for the shunt field winding 26 of the feed motor 18, and the welding control in general.

To provide relative motion of the work 14 and electrode 13, a travel motor 27 may be operatively connected with the work 14, such as by means of travel rolls 28 upon which the work may rest.

By utilizing a current interlocking relay 29 in the welding circuit to control energization of the travel motor 27, operation of the travel motor may be made dependent on the welding operation.

Energization of the welding system may be secured by operating the push button 32, which connects the operating coil 33 of an arc control switch 35 across the terminals of the constant potential source 24 through normally closed contact members of the stop button 36 and fixed contact member 37a and movable contact member 37b of a limit switch 37. Operation of the arc control switch 35 closes normally open contact members 35a and 35b to complete the balancing circuit of the Wheatstone bridge which includes the shunt field winding 22 of the control generator 21, and connects the shunt field winding 26 of the feed motor 18 across the terminals of the constant potential source 24, respectively. At the same time, closure of the push button 32 connects the operating coil 40 of contactor 41 across the terminals of the constant potential source 24, through fixed contact member 37c and movable contact member 37d of the limit switch 37. Operation of the contactor 41 closes normally open contact members 41a, 41b and 41c, completing, respectively, the energizing circuit for the armature 19 of the feed motor 18, a holding circuit of the operating winding 40, and an energizing circuit for the operating winding 43 of line switch 44 in the welding circuit.

Upon the closure of the normally open contact members 41a, the armature 19 of the feed motor 18 is connected directly across the armature 46 of the control generator 21. As the shunt field winding 26 of the feed motor is energized from the constant potential source 24 upon closure of the normally open contact members 35b, both the armature 19 and shunt field winding 26 of the feed motor 18 are now energized and it operates to drive the feed rolls 17 and feed the electrode 13 to contact the work 14. If instead, the feed motor 18 should be disposed to feed the electrode in the opposite direction, this may be corrected by operation of the reversing switch 20, which will reverse the direction of rotation of the feed motor 18 to feed the electrode 13 through the guide nozzle 12 in the desired direction.

Upon the electrode 13 contacting the work 14, the welding circuit will be completed from brush 50 of the welding generator 10, through one pole of the polarity reversing switch 11, conductor 51, nozzle 12, electrode 13, work 14, contact roller 15, conductor 53, normally closed contact members 55a of resistance shunting contactor 55, normally open contact members 44a of the line switch 44, operating coil 56 of the current interlocking relay 29, through the other pole of the reversing switch 11, series field winding 58, commutating field winding 59, and to the other brush 60 of the welding generator 10. Upon completion of the welding circuit current is caused to flow in the balancing circuit of the Wheatstone bridge control circuit of the feed motor 18 in a manner dependent upon the length of the arc between the electrode 13 and the work 14. As the shunt field winding 22 of the control generator 21, which energizes the armature 19 of the feed motor 18, is disposed in this balancing circuit, the feed motor 18 will be energized in a manner to establish and maintain the welding arc. For more complete details of the nature and operation of this Wheatstone bridge feed motor control circuit, reference may be had to the aforesaid United States Letters Patent No. 2,057,521, issued to William R. Harding, and assigned to the assignee of this application.

Upon completion of the welding circuit, the operating winding 56 of current interlocking relay 29 will be energized by the flow of current in the welding circuit to effect closure of its normally open contact members 29a. The closure of contact members 29a completes the energizing circuit for an interlocking contactor 62, which operates to close its normally open contact members 62a and connect the shunt field winding 64, the series field winding 65 and armature 66 of the travel motor 31 across the terminals of the constant potential source 24, to provide relative travel of the work 14 and electrode 13.

To provide for termination of a weld at any desired point, the limit switch 37 may be provided with a threaded shaft 70 operatively connected with the work or travel motor, such as by connection with one of the travel rolls 28, and having a traveling nut 71 disposed thereupon. Motion of the traveling nut 71 may, therefore, be proportional to the relative motion of the work 14 and electrode 13. Movable contact members 37b and 37d may be provided with realtively adjustable and pivotally mounted operating arms 74 and 75 disposed in association with the threaded shaft 70 in such a manner that motion of the traveling nut 71 therealong may actuate these arms. By adjusting the relative position of the arms 74 and 75 in association with the threaded shaft 70, the traveling nut 71 may be caused to operate the movable contact members 37b and 37d of the limit switch after any desired amount of relative travel of the work 14 and the electrode 13. By so adjusting the arm 74 that the traveling nut 71 will engage it, separating the movable contact member 37b from engagement with fixed contact member 37a and moving it into engagement with fixed contact member 37e at some predetermined point prior to cessation of a welding operation, the energizing circuit of the operating coil 33 of the arc control switch 35 may be interrupted and the operating coil 76 of the shunting contactor 55 may be energized. Upon deenergization of the operating coil 33 of the arc control switch 35 its contact members 35a and 35b will open, thereby deenergizing control generator shunt field winding 22 and the feed motor shunt field 26, thus effectively stopping the feed motor 18. Stoppage of the feed motor 18 results in a corresponding stoppage of the feed of the electrode 13, and as the welding current continues to flow, the arc between the work 14 and electrode 13 will gradually lengthen, effectively reducing penetration of the arc.

Upon the operation of the shunting contactor 55, by engagement of the limit switch contact members 37b and 37e, its normally closed contact members 55a are opened, thereby inserting the current limiting resistance 16 in the welding circuit, and further reducing the flow of welding current to limit the penetration of the arc.

By adjusting the position of the other arm 75 of the limit switch in such relation to the threaded shaft 70 and arm 74 that continued movement of the traveling nut 71 will engage it after some predetermined amount of relative travel of the work and electrode subsequent to the engagement of the traveling nut with the arm 74, normally closed contact members 37c and 37d of the limit switch 37 may be opened after such predetermined amount of relative travel, deenergizing the operating coil 40 of the contactor 41, which then opens contact members 41c to deenergize the operating coil 43 of the line switch 44. Upon deenergization of the line switch 44 the contact members 44a are opened to interrupt the flow of current in the welding circuit and deenergize the operating coil 56 of the current interlocking relay 29. Interlocking relay 29 thereupon opens contact members 29a to disconnect the operating coil 79 of the interlocking contactor 62 from the constant potential source 24. Upon such disconnection the interlocking contactor 62 opens contact members 62a, deenergizing the travel motor 27, and closes contact members 62b to connect a braking resistor 80 across the armature 66 of the travel motor. A holding coil 81 of the interlocking contactor may be disposed in shunt relation with the braking resistor 80 to insure closure of the contact members 62b immediately after deenergization of the operating winding 79 to maintain a braking circuit for the travel motor 27, and effectively stop relative travel of the work 14 and electrode 13.

Figure 2:
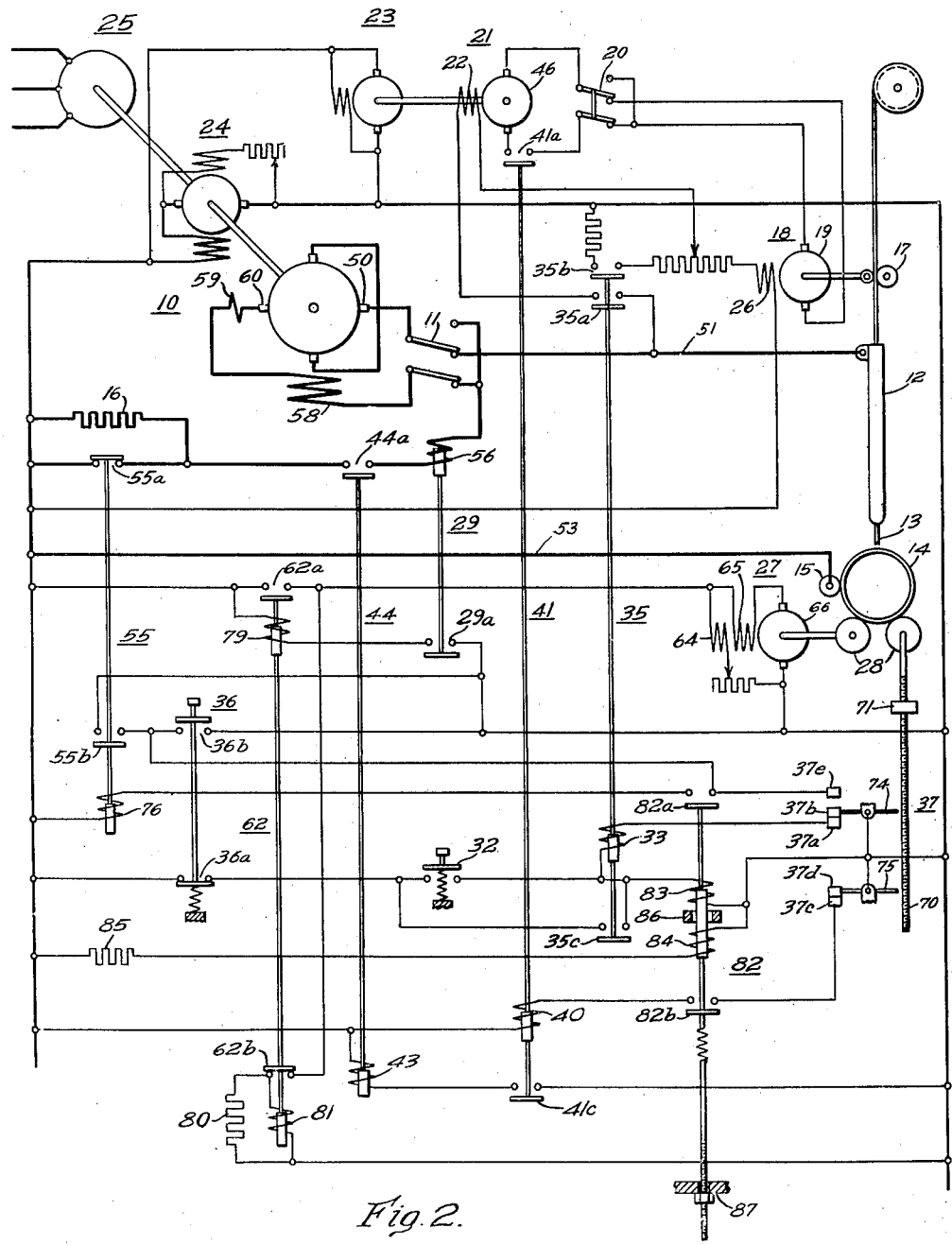
Fig. 2 illustrates diagrammatically a modified application of my invention to an automatic arc welding system.

Fig. 2 diagrammatically illustrates an alternative form of my invention whereby operation of the crater elimination control may be secured upon stoppage of the welding operation whether by means of the limit switch 37, as described hereinbefore, or by operation of the stop button 36. Since the functioning of this embodiment in response to the operation of the limit switch 37 is the same as for the system of Fig. 1 the description thereof will not be repeated.

To provide for operation of the crater elimination control upon stoppage of the welding operation by operation of the stop button 36, additional normally open contact members 36b are provided on the stop button 36 to complete the energizing circuit for the operating winding 76 of the shunting contactor 55. The feature of time delay between the reduction of welding current and stoppage of the electrode feed motor, and the cessation of the welding operation, as before secured by the relative positionings of the operating members 74 and 75 of the limit switch 37, may be provided by a time delay relay 82 when operation of the crater elimination features are desired upon stoppage by manipulation of the push button 36. The main operating winding 83 of the time delay relay 82 may be disposed in series circuit relation with the normally closed contact members 36a of the push button 36, while the neutralizing winding 84 which is disposed to neutralize any residual flux may be permanently connected to a source of energization through a control resistance 85 so that operation of the push button 36 will deenergize the main winding 83. Due to a short circuited damper winding 86, the time delay relay 82 does not open immediately upon deenergization, the time of such delay being adjustable through manipulation of resilient adjusting means 87.

Upon the operation of the stop push button 36, which results in energization of the operating coil 76 of the shunting contactor 55, through normally open contact members 36b and contact members 82a of the time delay relay 82, the normally closed contact members 55a of the shunting relay 55 are opened to insert the current limiting resistance 16 into the welding circuit, thereby reducing the flow of welding current as before. At the same time, opening of normally closed contact members 36a deenergizes the operating winding 33 of the control switch 35 and the main winding 83 of the time delay relay 82. Deenergization of control switch 35 stops the feed motor 18, thus effectively lengthening the arc and reducing its penetration.

A predetermined interval of time after the operation of the push button 36 and deenergization of the main winding 83 of the time delay relay 82, its contact members 82a and 82b open, deenergizing the operating winding 76 of the shunting contactor 55, and the operating winding 40 of the contactor 41. Deenergization of the contactor 41 opens contact members 41c, interrupting the energizing circuit of the operating winding 43 of the line switch 44, which opens contact members 44a to interrupt the welding circuit. Upon interruption of the welding circuit, as before, the operating winding 56 of the interlocking relay 29 is deenergized and contact members 29a open to deenergize the operating winding 79 of the interlocking contactor 62 and disconnect the travel motor 27 from the constant potential source 24.

Figure 3:
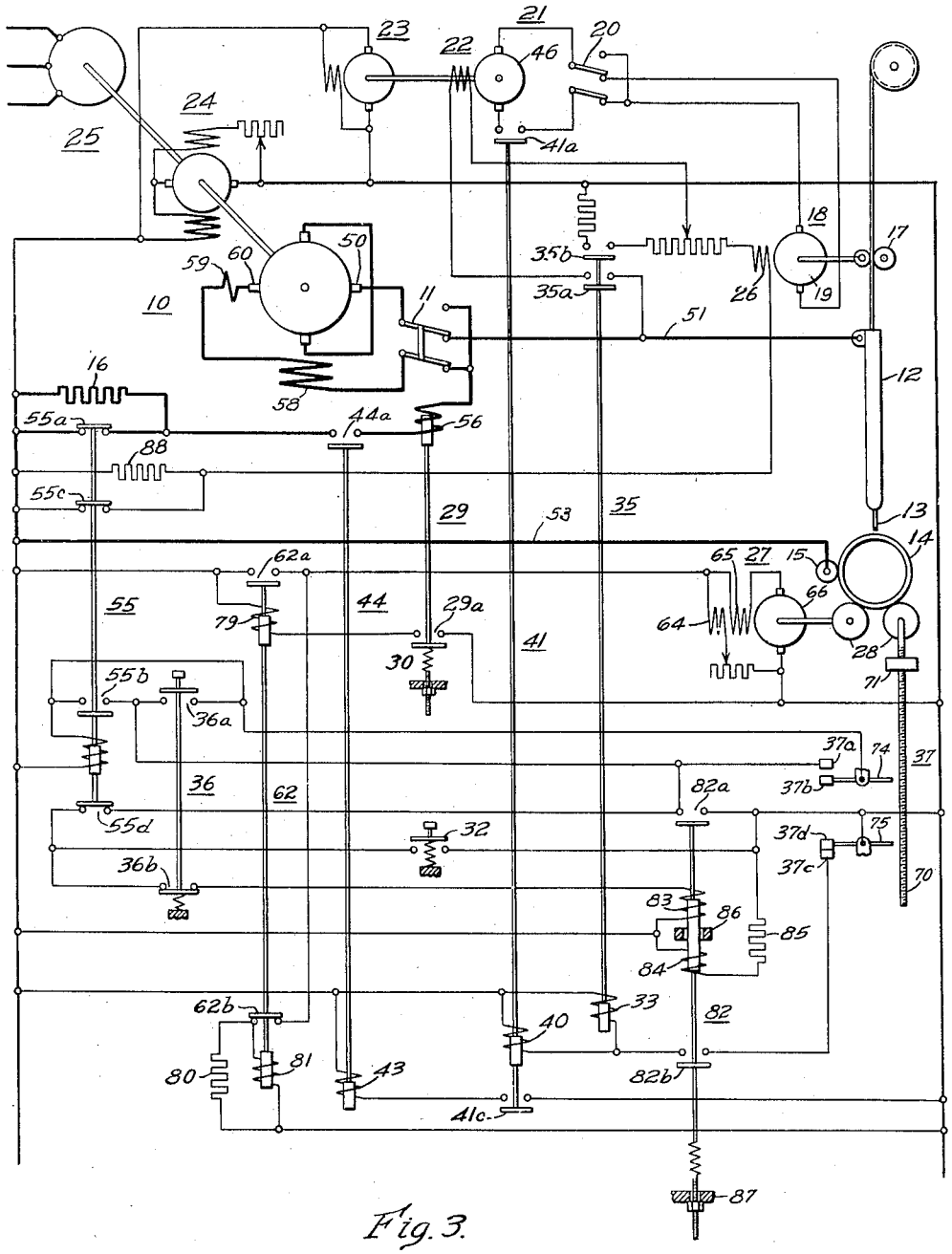
Fig. 3 illustrates diagrammatically still another embodiment of my invention in connection with an automatic arc welding system.

Referring to the embodiment of my invention in Fig. 3, it may be seen that I utilize a welding system with a Wheatstone bridge system of electrode feed control as heretofore set forth, and likewise embody the features of crater elimination control whether the welding operation be terminated by means of the limit switch 37 or by operation of the push button 36. In this form of my invention, I also prefer to secure a reduction in the penetration of the arc by both a reduction of the welding current and a lengthening of the arc prior to cessation of a welding operation. In this embodiment, however, I prefer to secure the lengthening of the arc by the introduction of a control resistance 88 into the feed motor control circuit, thereby creating an unbalance in the Wheatstone bridge circuit which results in a change of current flow in the balancing circuit thereof. As the shunt field winding 22 of the control generator 21 is connected in this balancing circuit, its voltage is varied to correspondingly vary the operation of the feed motor 18 to automatically increase the length of the arc.

In this instance the results are obtained by providing additional normally closed contact members 55c and 55d on the shunting contactor 55. Contact members 55c being in shunt circuit relation with the control resistance 88, operation of the shunting contactor 55 not only results in the introduction of the current limiting resistance 16 into the welding circuit to reduce the flow of welding current, as before, but also introduces the control resistance 88 into the feed motor control circuit, by opening normally closed contact members 55c to vary the operation of the feed motor 18 to lengthen the arc and further reduce penetration. Normally open contact members 55b may be disposed in shunt relation with the contact members 36a to provide a holding circuit for the shunting relay 55, while the normally closed contact members 55d may provide a holding circuit for the time delay relay 82, through winding 83, normally closed contact members 36b, normally closed contact members 55d and contact members 82a, across the constant potential source 24. By placing the operating coil 33 of the arc control switch 35 and the operating coil 40 of the control contactor 41 in shunt circuit relation with each other and in series circuit relation with the normally closed contact members 37c and 37d of limit switch 37, and contact members 82b of the time delay relay 82, deenergization of the arc control switch 35 and control contactor 41 may be delayed substantially following the reduction of welding current and increase of arc length, thus permitting the continued energization of the feed motor 18 to maintain the lengthened arc for a predetermined interval of time. Other features of the welding system may be as heretofore described and the sequence of operations as set forth in the other embodiments of my invention.

Since energization of the travel motor 27 is dependent upon the current interlocking relay 29 in the welding circuit, it may be seen that by providing adjusting means 30 for the relay 29 and permitting it to drop out at different minimum current values, deenergization of the travel motor 27 may be secured either upon a predetermined reduction of welding current, or delayed until the welding circuit is opened. In this manner it may be possible to eliminate a weld crater by filling the crater itself with weld metal while welding at a reduced current or with a lengthened arc while there is no relative motion of the work with respect to the electrode, or by welding progressively with reduced current and lengthened arc to limit penetration.

If desirable, by a variation of the shunting relay 55, it may be possible to gradually insert successive steps of resistance into the welding circuit or feed motor control circuit or both, so as to gradually taper off the welding operation.

It may, therefore, be seen from the foregoing detailed description and the accompanying drawings that I have by my invention provided means for reducing the penetration of an arc in an automatic arc welding system that not only is simple to build, but effective and flexible in operation. The features of controlling the penetration of an arc in an automatic electric arc welding system may be seen to be readily applicable to other forms of welding systems than herein shown and readily used with other types of welding generators than set forth in this embodiment.

Since certain changes may be made in the above construction and different embodiments of the invention may be made without departing from the spirit thereof, it is intended that all the matter contained in the above description or shown in the accompanying drawings shall be considered as illustrative, and not in a limiting sense.

I claim as my invention:

1. An electric arc welding system comprising, a welding circuit including an electrode and work upon which a welding operation is to be performed, means for feeding the welding electrode to normally maintain an arc of substantially constant length with work, switch means operable to initiate the cessation of a welding operation, and control means responsive upon the operation of the switch means to control the feeding means to maintain an arc of different length, and means operative on the completion of predetermined conditions to interrupt the welding circuit.

2. The combination comprising, a source of welding current, a welding circuit including an electrode and work upon which a welding operation is to be performed, feed means for maintaining the electrode in operating relation with the work, circuit means for controlling the feed means in accordance with the arc voltage, switch means operable to initiate cessation of a welding operation, and relay means associated with said circuit means disposed upon operation of said switch means to effect a change in said circuit means to control the operation of the feed means to maintain the arc at an increased length and thereby limit the flow of welding current substantially prior to cessation of a welding operation.

3. An electric arc welding system comprising, a source of welding current, a welding electrode and work upon which a welding operation is to be performed connected to said source, means for feeding said electrode to maintain an arc between the electrode and the work, switch means operable to interrupt a welding operation, relay means operable to control said feeding means to vary the rate of feed and maintain an arc of increased length, and control switch means disposed to initiate operation of said switch means and relay means, operation of said relay means being substantially prior to the interruption of the welding operation.

4. An electric arc welding system comprising, in combination, a source of welding current, a welding circuit including an electrode and work upon which a welding operation is to be performed associated with said source, means including a travel motor adapted to provide relative movement of the work and electrode, feed means for feeding an electrode to normally maintain an arc of substantially constant length between the electrode and the work, relay means operable to control the feed means to maintain a longer than normal arc, switch means operable upon completion of predetermined conditions to open the welding circuit, and relay means operable in response to predetermined current conditions in the welding circuit to deenergize the travel motor.

5. The combination in an automatic arc welding system comprising, a source of welding current, a welding circuit in connection therewith including work upon which a welding operation is to be performed and a fusible electrode, a feeding mechanism provided with control means adapted to maintain an arc between the work and electrode, switch means operable to initiate cessation of a welding operation, relay means disposed upon operation of said switch means to increase the impedance of the welding circuit to limit the flow of welding current and increase the impedance of the feeding mechanism control means to lengthen the arc, and means operable upon completion of predetermined conditions to deenergize the feeding mechanism and open the welding circuit.

6. An arc welding system comprising the combination, of a cross-field type of welding generator, a welding circuit in connection therewith including work upon which a welding operation is to be performed and a welding electrode, a line switch disposed to control the welding circuit, feed means for said electrode having a control system disposed to maintain an arc between said electrode and work, means including a travel motor adapted to provide relative motion between the work and electrode, switch means operable to initiate cessation of a welding operation, relay means disposed upon operation of said switch means to open normally closed contact members to increase the impedance of the welding circuit and the feed motor control system, thereby limiting the flow of welding current and lengthening the arc to reduce arc penetration, control switch means operable a predetermined interval of time after operation of said switch means to deenergize said feed means and line switch, and relay means dependent on deenergization of said line switch to deenergize the travel motor upon completion of a welding operation.

7. The combination comprising, a source of welding current, a welding circuit in connection with the source including work on which a welding operation is to be performed and a welding electrode, control means disposed to connect the welding circuit to the source, means including a feed motor for feeding the electrode, a Wheatstone bridge control circuit associated with the arc and said feed motor for controlling the feed motor to maintain the arc, travel means including a travel motor adapted to secure relative movement of the work and electrode, switch means operable to initiate cessation of a welding operation, relay means operable upon operation of said switch means to open normally closed contact members and increase the resistance in one leg of said Wheatstone bridge control circuit thereby increasing said arc length and reducing penetration of the arc, additional switch means operable after a predetermined amount of relative travel of the work and electrode subsequent to operation of the first-mentioned switch means to open normally closed contact members to deenergize said control means to interrupt the welding circuit, and means responsive to deenergization of the welding circuit to deenergize the travel motor.

8. An automatic arc welding system comprising, in combination, a constant current source of welding current, a welding circuit in connection therewith including a welding electrode and work upon which a welding operation is to be performed, means for feeding said welding electrode comprising a feed motor in association with a balanced Wheatstone control circuit, travel means including a travel motor for securing relative travel of the work and electrode, relay means operable to open normally closed contact members to increase the impedance of the welding circuit to limit the flow of current therein, limit switch means operable after a predetermined amount of relative travel between the work and electrode to energize said relay means, said limit switch means also being disposed to deenergize the feed motor, and additional limit switch means operable after a predetermined amount of relative travel of the work and electrode subsequent to operation of first-mentioned limit switch means to provide for interruption of the welding circuit and deenergization of the travel motor.

9. In an automatic arc welding circuit, the combination comprising, a source of welding current, a welding circuit in connection with the source including an electrode and work upon which a welding operation is to be performed, feeding means for said electrode comprising a feed motor and a Wheatstone bridge control circuit for said feed motor, means including a travel motor for securing relative travel of the work and the elctrode, a line switch disposed to open or close the welding circuit externally of the arc, relay means operable on opening of the welding circuit to deenergize the travel motor, switch means disposed to control operation of said line switch, and additional relay means operable substantially prior to the opening of the welding circuit to open normally closed contact members controlling the impedance of the feed motor control circuit and the welding circuit to limit penetration of the arc.

10. In combination, a constant current source of welding current, a welding circuit including an electrode and work upon which a welding operation is to be performed, a line switch for connecting the welding circuit to the source, means including a motor and a balanced control circuit therefor to provide for feeding the electrode, means including a travel motor for securing relative travel of the work and electrode, a constant potential source of control excitation, switch means having normally closed contact members and normally open contact members, relay means operable upon closure of the said normally open contact members to increase the resistance of the welding circuit, time delay means operable upon opening of said associated normally closed contact members to deenergize said line switch a predetermined interval of time after operation of said switch means, and means responsive to a predetermined flow of current in the welding circuit to control the energization of the travel motor.

11. In an arc welding system, the combination of a source of welding current, a welding circuit including a fusible electrode and work upon which a welding operation is to be performed associated with the source, a current limiting resistor associated with the welding circuit, feed means including a feed motor and a balanced control circuit in connection therewith disposed to feed the electrode and maintain an arc between the work and the electrode, travel means including a travel motor adapted to provide relative travel of the work and the electrode, a control resistor associated with the feed motor control circuit, a control relay operable to open normally closed contact members in shunt circuit relation with said resistors thereby limiting current flow in the welding circuit and lengthening the arc, relay means operable upon reduction of welding current to control deenergization of the travel motor, switch means operable to energize said control relay, and additional switch means operable substantially subsequent to operation of first-mentioned switch means to deenergize the welding circuit.

12. The combination in an automatic arc welding system comprising, a source of welding current, a welding circuit in connection with the source including work upon which a welding operation is to be performed and a welding electrode, means for feeding the electrode comprising a feed motor and a control circuit disposed to maintain a welding arc between the work and the electrode, a travel motor adapted to provide relative travel of the work and electrode, limit switch means having jointly operable normally closed contact members and normally open contact members, additional switch means having jointly operable normally open contact members and normally closed contact members, relay means operable on actuation of either of the aforesaid switch means to open normally closed contact members in shunt circuit relation with a portion of the welding circuit, additional relay means operable on actuation of either of the aforesaid switch means to deenergize the feed motor, a line switch operable to open the welding circuit, relay means adapted to deenergize the travel motor on opening of the welding circuit, and means for operating the line switch substantially subsequent to operation of the first-mentioned switch means.

13. A welding system comprising the combination of, a source of welding current, a welding circuit including a fusible welding electrode, work upon which a welding operation is to be performed and a current limiting resistance associated with said source, means including a feed motor and a control circuit for feeding said electrode to maintain an arc, a travel motor for providing relative motion of the work and electrode, an electro-responsive switch for controlling the welding circuit external to the arc, means responsive to a predetermined flow of welding current to control energization of said travel motor, control switch means operable to initiate cessation of a welding operation, relay means having normally closed contact members in shunt relation with said current limiting resistance operable in response to the operation of said control switch means to open its contact members to render said current limiting resistance effective to limit the welding current, switch means operable upon actuation of said control switch means to deenergize the feed motor, and relay means operable upon completion of predetermined conditions to interrupt the welding circuit and effect deenergization of the travel motor.

14. The combination in an automatic arc welding system comprising, a source of welding current, a welding circuit including an electrode and work upon which a welding operation is to be performed, switch means for controlling the welding circuit, means including a travel motor disposed to provide relative travel of the work and electrode, feed means including a feed motor and a Wheatstone bridge control circuit adapted to feed said electrode and maintain an arc between the work and said electrode, relay means operable to vary the impedance of said control circuit thereby varying the rate of electrode feed to lengthen the arc, limit switch means associated with said travel means, normally open contact members associated with said limit switch operable after a predetermined amount of relative travel of the work and electrode to energize said relay means, normally closed contact members associated with the limit switch disposed to effect the deenergization of the feed motor to lengthen the arc, additional movable contact members in connection with said limit switch operable after a predetermined amount of relative travel of the work and electrode subsequent to operation of the first-mentioned limit switch contact members to effect the deenergization of the welding circuit switch and the travel motor.

15. In combination, a source of welding current, a welding circuit including a welding electrode and work upon which a welding operation is to be performed, a line switch for controlling the welding circuit, means including a feed motor and control circuit for feeding the electrode to maintain an arc between the work and electrode, a control resistance connected with the control circuit travel means disposed to provide relative travel of the work and the electrode, relay means responsive to cessation of current flow in the welding circuit to deenergize the travel motor, control means associated with the control resistance operable to control operation of the feed motor to alter the arc length, switch means dependent on relative travel of the work and electrode operable to effect energization of said control means to control the operation of the feed motor, and contact means associated with said switch means operable after a predetermined amount of relative travel of the work and the electrode subsequent to the first-mentioned operation of said switch means to deenergize said line switch to open the welding circuit.

16. A welding system comprising, in combination, a cross-field generator source of welding current, a constant potential source of control current, a welding circuit including an electrode, a current limiting resistance and work upon which a welding operation is to be performed connected to the source of welding current, means for feeding the electrode to maintain an arc between the work and the electrode, a travel motor disposed to provide relative motion of the work and the electrode, switch means dependent on flow of current in the welding circuit to connect or disconnect the travel motor from the constant potential source, line switch means operable to open or close the welding circuit, relay means having normally closed contact members in shunt circuit relation with the current limiting resistance, said relay means being operable to open said normally closed contact members to increase the resistance of the welding circuit to reduce the current flow therein, control means operable to energize said relay means, time delay means operable upon actuation of said control means to deenergize the feed motor and line switch a predetermined interval of time after actuation of said control means, thereby opening the welding circuit and deenergizing the travel motor and feed motor at substantially the same time.

17. In an arc welding system, the combination comprising, a source of welding current, a welding circuit including an electrode and work upon which a welding operation is to be performed, line switch means disposed to connect the welding circuit to the source, means comprising a feed motor and associated control circuit disposed to feed the electrode and maintain an arc between the electrode and the work, travel means for providing relative travel of the work and electrode, control means adapted to initiate cessation of a welding operation, relay means associated with the welding circuit and the feed motor control circuit disposed upon operation of said control means to increase the impedance of said circuits thereby limiting the flow of welding current and increasing the length of arc maintained by the feed motor, means disposed upon completion of predetermined conditions subsequent to operation of said control means to deenergize the line switch means to open the welding circuit, and means responsive to limitation of the welding current disposed to deenergize the travel means.

18. The combination in an arc-welding system, of a welding circuit including an electrode for maintaining an arc with a workpiece, means for feeding the electrode relative to the work, a balanced control circuit for controlling the feed means in accordance with arc conditions, switch means for initiating cessation of a welding operation, impedance means connected with the control circuit, relay means associated with said impedance means adapted on operation of said switch means to vary the impedance of the control circuit and regulate the feed means to lengthen the arc and limit the arc current.

19. In an arc welding system, in combination, a welding circuit including an electrode for maintaining an arc with a workpiece, a reversible feed motor for feeding the electrode relative to the workpiece, a balanced bridge circuit including an excitation winding of said feed motor associated with the arc for regulating the operation of the feed motor, impedance means associated with the bridge circuit, switch means operable to initiate cessation of a welding operation, and relay means associated with said impedance for altering the impedance of the bridge circuit to effect a change in the operation of the feed motor upon operation of said switch means.

20. In a welding system the combination, of a welding circuit including a fusible electrode for maintaining an arc with a workpiece, means for feeding the electrode to regulate the arc including a feed motor having a separately excited field winding, circuit means for controlling the feed motor comprising a Wheatstone bridge circuit including the separately excited field winding of the feed motor associated with the arc, relay means associated with the bridge circuit for varying the balance of said bridge circuit to affect the regulation of the arc, and switch means for initiating cessation of a welding operation adapted to effect operation of said relay means.

JOHN H. BLANKENBUEHLER.